(12) United States Patent
Harmon et al.

(10) Patent No.: US 8,756,784 B2
(45) Date of Patent: Jun. 24, 2014

(54) SEAL PROTECTOR ASSEMBLY

(75) Inventors: Caleb G. Harmon, Hartland, MI (US);
Edward J. Billings, Ann Arbor, MI (US); Kelly Pietras, Oakland Township, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 635 days.

(21) Appl. No.: 12/970,389

(22) Filed: Dec. 16, 2010

(65) Prior Publication Data

US 2011/0179620 A1     Jul. 28, 2011

Related U.S. Application Data

(60) Provisional application No. 61/297,499, filed on Jan. 22, 2010.

(51) Int. Cl.
*B23P 11/00*     (2006.01)

(52) U.S. Cl.
USPC ............... 29/426.2; 29/463; 29/460; 277/551

(58) Field of Classification Search
USPC ................ 29/426.1, 224; 277/551–560, 349; 49/460–463
See application file for complete search history.

(56) References Cited

U.S. PATENT DOCUMENTS

| | | | | |
|---|---|---|---|---|
| 3,591,125 | A * | 7/1971 | Lewis | 277/485 |
| 5,553,866 | A * | 9/1996 | Heinzen | 277/551 |
| 6,511,075 | B1 | 1/2003 | Schmidt | |
| 6,676,130 | B2 * | 1/2004 | Schmitt | 277/349 |
| 6,688,603 | B2 * | 2/2004 | vom Schemm | 277/553 |
| 6,857,636 | B2 | 2/2005 | Bengoa et al. | |
| 6,860,486 | B2 * | 3/2005 | Hacker et al. | 277/553 |
| 6,921,080 | B2 | 7/2005 | Johnen | |
| 2002/0038937 | A1 * | 4/2002 | Kawada et al. | 277/321 |
| 2002/0070236 | A1 * | 6/2002 | Wolf et al. | 222/153.05 |
| 2004/0182198 | A1 | 9/2004 | Marich | |
| 2008/0007007 | A1 * | 1/2008 | Johnen | 277/317 |
| 2008/0315530 | A1 * | 12/2008 | vom Schemm | 277/549 |

* cited by examiner

*Primary Examiner* — Minh Trinh (57) ABSTRACT

A seal protector assembly is provided. The seal protector assembly includes a cavity for encasing a seal. A plug or cap is removably attached to the protector seal. After shipment of the transmission, the plug or cap is removed. Once any potential damage to the seal during assembly has passed, the protector is then removed.

19 Claims, 9 Drawing Sheets

SEAL PROTECTOR ASSEMBLY

CROSS-REFERENCE TO RELATED APPLICATIONS

This application claims the benefit of U.S. Provisional Application No. 61/297,499 filed on Jan. 22, 2010, which is hereby incorporated in its entirety herein by reference.

TECHNICAL FIELD

The invention relates to a seal protector assembly operable to protect a seal during shipping and assembly, and more particularly a seal protector assembly that protects a seal attached to a transmission.

BACKGROUND

A typical multi-speed transmission uses a combination of torque transmitting devices, gear sets, and shafts controlled by an electro-hydraulic control system to provide a plurality of forward and reverse gear ratios for a motor vehicle. These components are encased within a protective transmission case or housing. During assembly of the motor vehicle, the transmission is shipped and washed prior to installation. Accordingly, openings must be sealed during shipment in order to prevent debris from entering the transmission and to prevent water from entering the transmission during washing. In addition, it is desirable to protect exposed components, such as rubber seals, that can be damaged during shipment or installation of the transmission.

For example, a typical transmission includes an opening for receiving an axle shaft that connects the output of the engine to the input of the transmission. The opening includes an axial seal that seals the transmission once the axle shaft has been installed. However, the typical axle shaft includes a splined end that is inserted into the opening of the transmission. This splined end can damage the axial seal that surrounds the opening, thereby leading to axle seal leaks that can damage the transmission. Accordingly, there is a need for a seal protector assembly that protects the transmission and the seal from damage during transportation and during installation, while remaining easy to remove during assembly.

SUMMARY

A seal protector assembly is provided. The seal protector assembly includes a cavity for encasing a seal. A plug or cap is removably attached to the protector seal. After shipment of the transmission, the plug or cap is removed. Once any potential damage to the seal during assembly has passed, the protector is then removed.

In one embodiment, the plug snaps onto the seal protector.

In another embodiment, the plug screws onto the seal protector.

In yet another embodiment, the plug includes a breakaway feature that separates the seal protector along an axis thereof.

In yet another embodiment, the plug is a piercable rubber and the seal protector clamps the plug between two hinged members.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
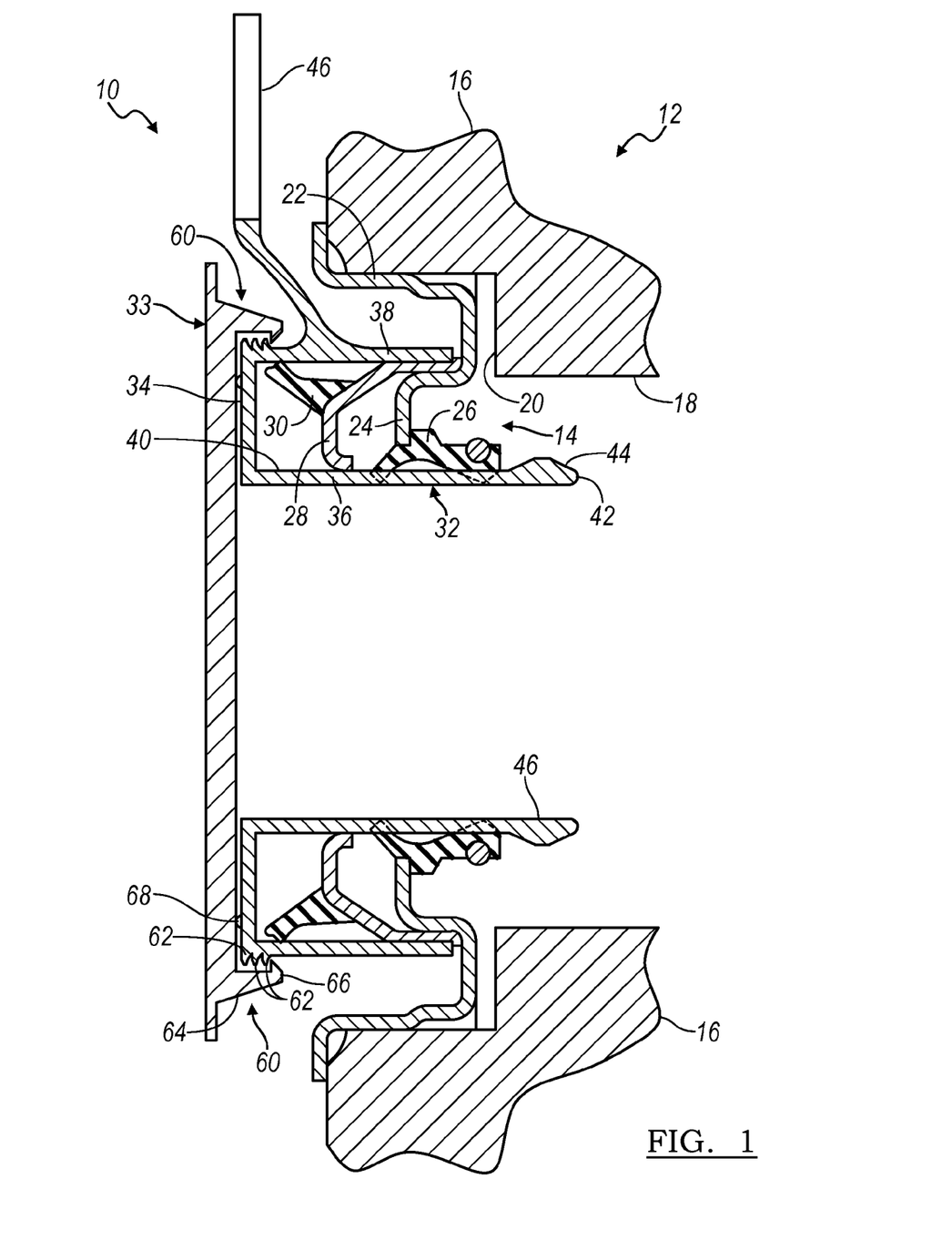
FIG. 1 is a cross-sectional view of a seal protector assembly according to the principles of the present invention shown in use with an exemplary axle seal and a portion of an exemplary transmission.
Figure 2:
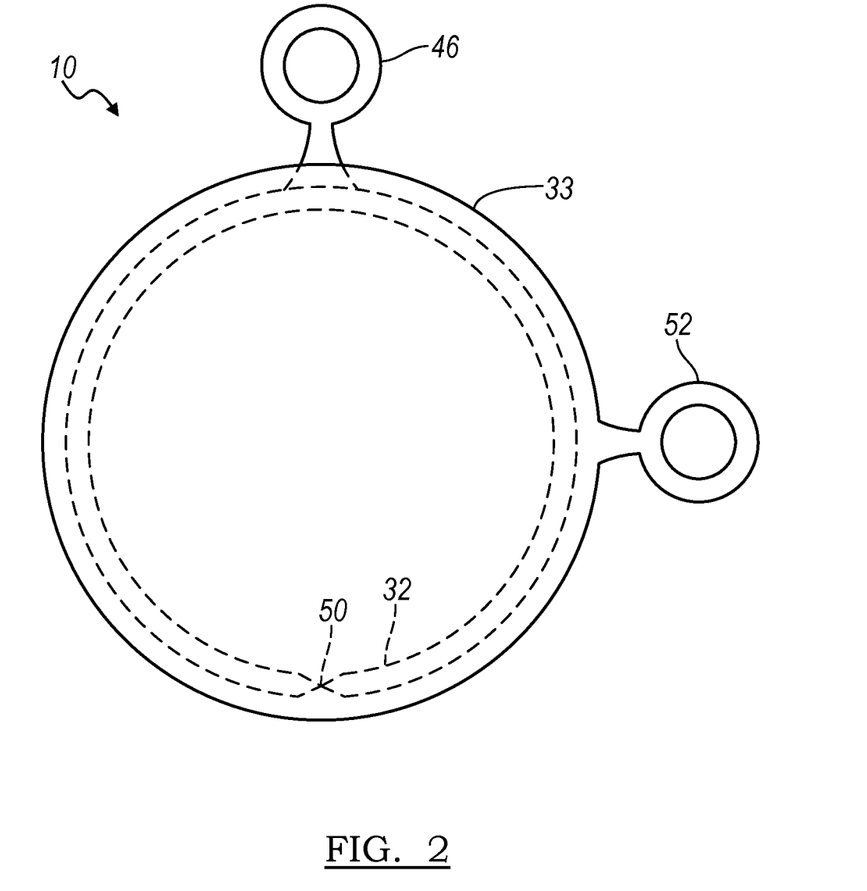
FIG. 2 is a front view of the seal protector assembly shown in FIG. 1.

With combined reference to FIGS. 1 and 2, a seal protector assembly according to the principles of the present invention is generally indicated by reference number 10. The seal protector assembly 10 is shown in use with an exemplary transmission 12 having an exemplary axle seal 14. The transmission 12 includes a typically cast, metal housing or case 16 which encloses and protects the various components of the transmission 12. The housing 16 includes a variety of apertures, passageways, shoulders and flanges which position and support these components. In particular, the housing 16 defines an input opening 18 that receives an axle shaft or other input from an engine (not shown) of the motor vehicle. The transmission housing 16 further includes a radial slot 20 disposed around the input opening 18. It should be appreciated that the transmission 12 may be, for example, a front wheel drive transmission, a rear wheel drive transmission, a dual clutch transmission, a hybrid transmission, or any other type of transmission without departing from the scope of the present invention.

The axle seal 14 is annular and includes a metal flange 22 press fit or otherwise attached to the transmission housing 16 within the radial slot 20. The flange 22 extends radially inwardly and terminates in a distal end 24. A rubber seal 26 is connected to the distal end 24 of the flange 22. The rubber seal 26 is operable to seal against an axle shaft or other component, as will be described in greater detail below, to prevent oil leakage out of the transmission 12 during operation of the motor vehicle. The axle seal 14 also includes an assembly guard 28 and a slinger lip 30, however, these components may be removed from the axle seal 14 without departing from the scope of the present invention. It should be appreciated that the shape of the axial seal 14 and the specific configuration and materials used may vary without departing from the scope of the present invention.

The seal protector assembly 10 is operable to close the opening 18 to the transmission 12 during shipment of the transmission 12 and to protect the rubber seal 26 during assembly of the transmission 12 within the motor vehicle. The seal protector assembly 10 includes a seal protector 32 and a plug or cap 33. The seal protector 32 includes a radial portion 34 and inner and outer annular members 36 and 38, respectively, connected with the radial portion 34. The inner and outer annular members 36 and 38 extend in an axial direction relative to the radial portion 34 and are disposed parallel and opposite one another. The inner surface of the radial portion 34, the inner surface or inner diameter of the outer member 38, and the outer surface or outer diameter of the inner member 36 cooperate to define a cavity 40. The cavity 40 is sized to receive a portion of the seal 14 therein. The inner member 36 includes a distal end 42 having a raised portion or annular lip 44 disposed on the outer surface or outer diameter of the inner member 36. The inner surface or inner diameter of the inner member 36 defines an aperture 46 that communicates with the opening 18 of the transmission housing 16.

The outer member 38 includes a pull feature 46 configured to allow a user of the seal protector 32 to grasp the seal protector 32 in order to remove the seal protector 32 from the axle seal 14. In the embodiment provided, the pull feature 46 is a handle that extends from the outer surface of the outer member 38. However, it should be appreciated that the pull feature 46 may have various other configurations without departing from the scope of the present invention. In order to aid in the removal of the seal protector 32, the seal protector 32 includes at least one reduced thickness portion 50 that extends along the axis of the seal protector 32, best seen in FIG. 2, that is configured to break or separate the seal protector 32 along its axis when sufficient pull force is applied to the seal protector 32.

The plug 33 is a disc sized to cover the aperture 46 of the seal protector 10. The plug 33 includes a pull feature 52 configured to allow a user of the seal protector assembly 10 to grasp the plug 33 in order to remove the plug 33 from the seal protector 32. In the embodiment provided, the pull feature 52 is a handle that extends from the outer surface or outer diameter of the plug 33. However, it should be appreciated that the pull feature 52 may have various other configurations without departing from the scope of the present invention.

The plug 33 is secured to the seal protector 32 via a plug retention feature 60. The plug retention feature 60 is configured to releasably secure the plug 33 to the seal protector 32 during shipment of the transmission 12 in order to close off or seal the aperture 46 that leads to the opening 18 in the transmission case 16. The retention feature 60 includes at least one radially extending curved annular rib 62 disposed on the outer surface of the outer member 38 proximate the radial portion 34. In the example provided, the seal protector 32 includes three annular ribs 62. The retention feature 60 also includes an axially extending annular tab 64 disposed on a surface of the plug 33. The annular tab 64 includes a hooked distal end 66 configured to grab the bent ribs 62. Accordingly, the retention feature 60 provides a snap-fit between the plug 33 and the seal protector 10. When installed, the plug 33 is parallel with the radial portion 34 of the seal protector 10 and covers the aperture 46. To provide additional sealing, seals 68 may be located between the plug 33 and the radial portion 34. The seals 68 may include separate compressible components or may include a compressible raised portion integrated with the radial portion 34.

In the example provided, the plug 33 is a unitary plastic component and the seal protector 32 is also a unitary plastic component. Both the plug 33 and the seal protector 32 may be created using known injection molding techniques. It should be appreciated, however, that the plug 33 and seal protector 32 may be made of different materials, in different manners, and from separate pieces without departing from the scope of the present invention.

During shipment or storage of the transmission 12, the seal protector 32 is inserted into the opening 18 such that the rubber seal portion 26 and a portion of the flange 22 are enclosed within the cavity 40 of the seal protector 32. The annular lip 44 prevents the seal protector 32 from slipping off the transmission 12. The plug 33 is press fit onto the seal protector 32.

Figure 3A:
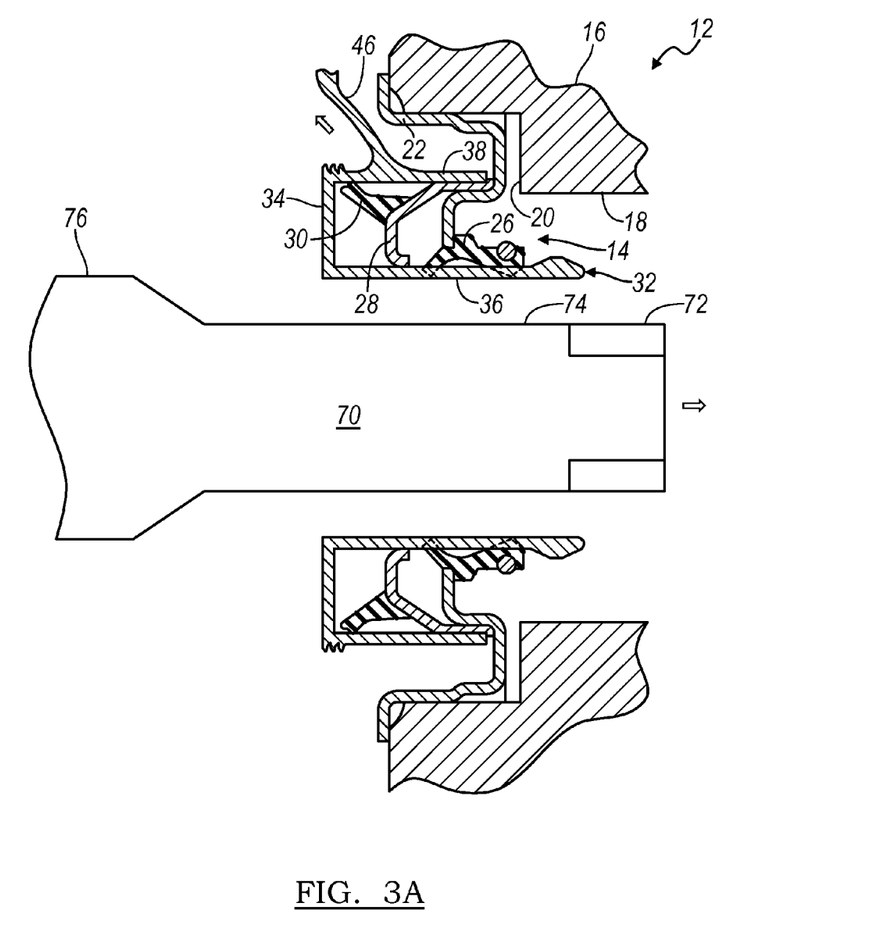
FIG. 3A is a cross-sectional view of a portion of a transmission having an axle seal with a portion of a seal protector assembly removed during installation of an axle shaft.
Figure 3B:
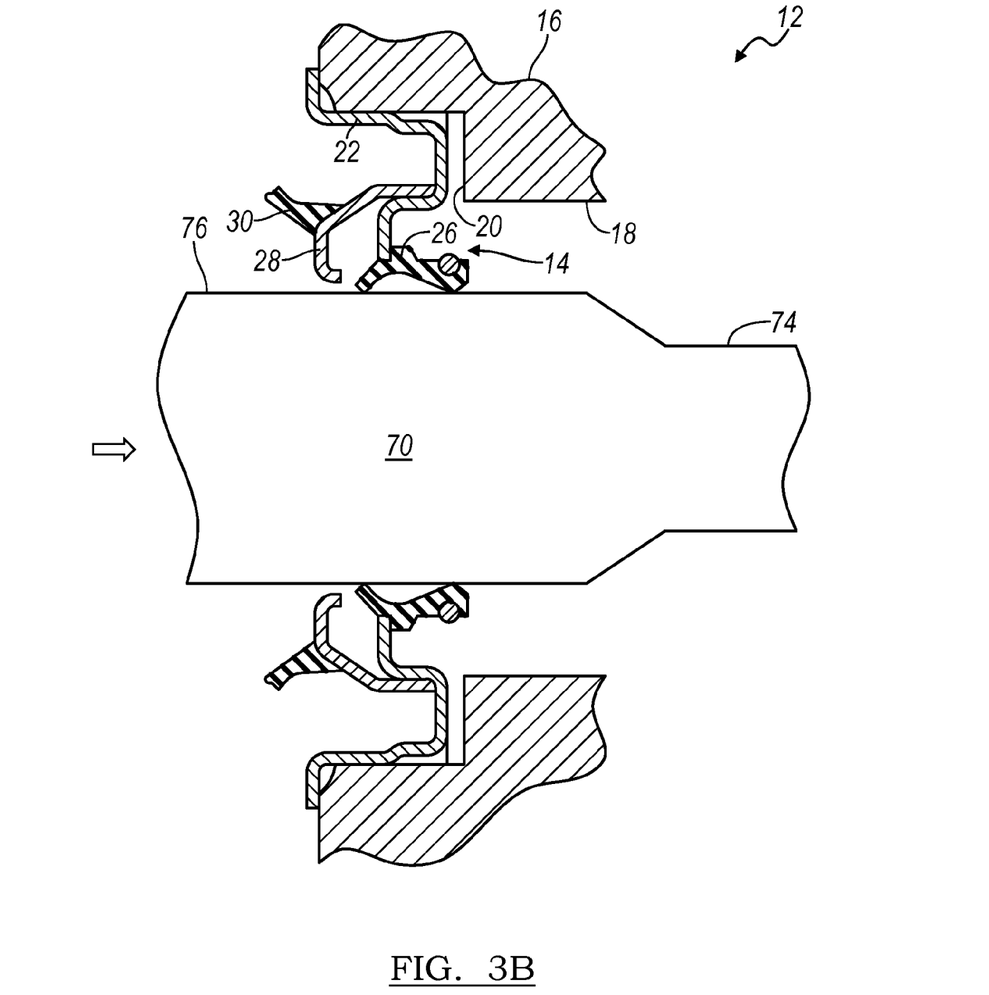
FIG. 3B is a cross-sectional view of a portion of a transmission having an axle seal sealed to an axle shaft.

In order to assemble the transmission 12 with the motor vehicle, the plug 33 is removed by employing the pull feature 52, thereby revealing the aperture 46 that communicates with the opening 18 in the transmission 12. Turning to FIG. 3A, once the plug 33 has been removed, an axle shaft 70 is inserted into the aperture 46 and into the opening 18 of the transmission 12. The axle shaft 70 has splines 72 on an end thereof as well as a reduced diameter portion 74 and an increased diameter portion 76. The seal protector 32, specifically the inner member 36, protects the rubber seal portion 26 from any contact with the splines 72 as the axle shaft 70 passes into the opening. Once the splines 72 have passed the rubber seal portion 26 but before the increased diameter portion 76 has reached the seal protector 32, the seal protector 32 is removed using the pull feature 46. The seal protector 32 separates at the reduced thickness portion 50 and the seal protector 32 is able to deflect and be pulled off the axle seal 14 and the axle shaft 70. Turning to FIG. 3B, the axle shaft 70 is then further inserted until the axle seal 14 seals to the increased diameter portion 76 of the axle shaft 70.

Figure 4:
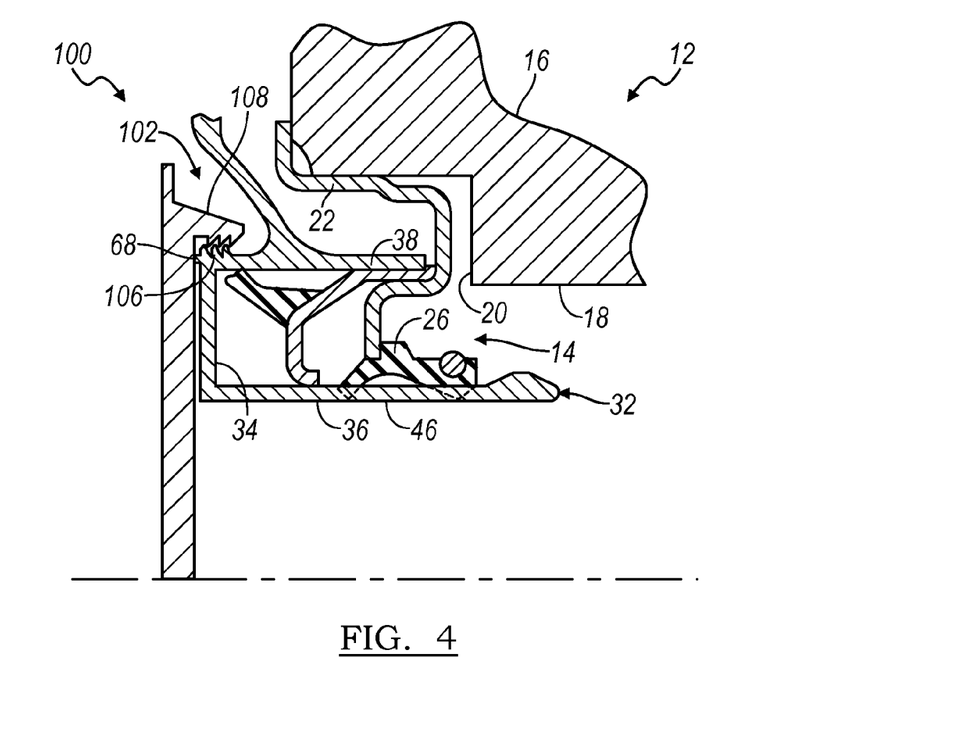
FIG. 4 is a partial cross-sectional view of another embodiment of a seal protector assembly according to the principles of the present invention shown in use with an exemplary axle seal and a portion of an exemplary transmission.
Figure 5:
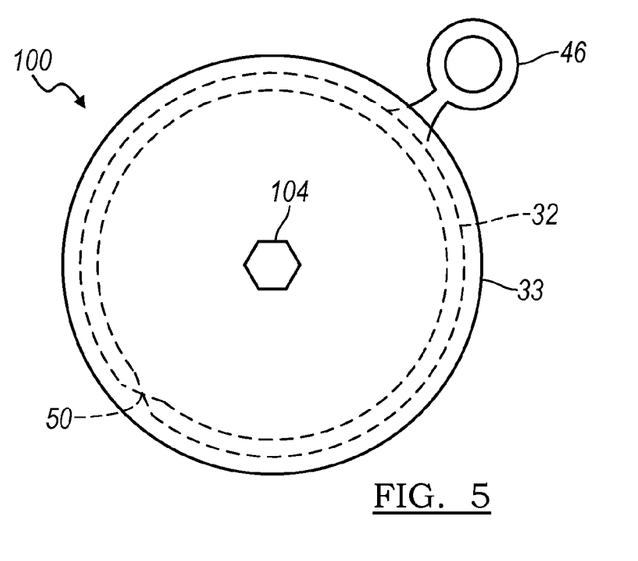
FIG. 5 is a front view of the seal protector assembly shown in FIG. 4.

With reference to FIGS. 4 and 5, an alternate seal protector assembly is generally indicated by reference number 100. The seal protector assembly 100 is similar to the seal protector assembly 10 and therefore like components are indicated by like reference numbers. However, the seal protector assembly 100 includes a retention feature 102 and the plug 33 includes a pull feature 104. The retention feature 102 is comprised of threads 106 disposed on the outer surface of the outer member 38 of the seal protector 32 and matching threads 108 disposed on an inner surface of the annular tab 64. Therefore, the retention feature 102 provides a screw fit between the plug 33 and the seal protector 32.

The pull feature 102 is comprised of a hex nut or other feature located centrally on an outer surface of the plug 33. Accordingly, the plug 33 may be screwed on and off the seal protector 32 using a mechanical device. Alternative pull features 102 may include, for example, a handle for turning the plug 33 manually. The seal protector assembly 100 otherwise operates in a manner similar to the seal protector assembly 10 as described above.

Figure 6:
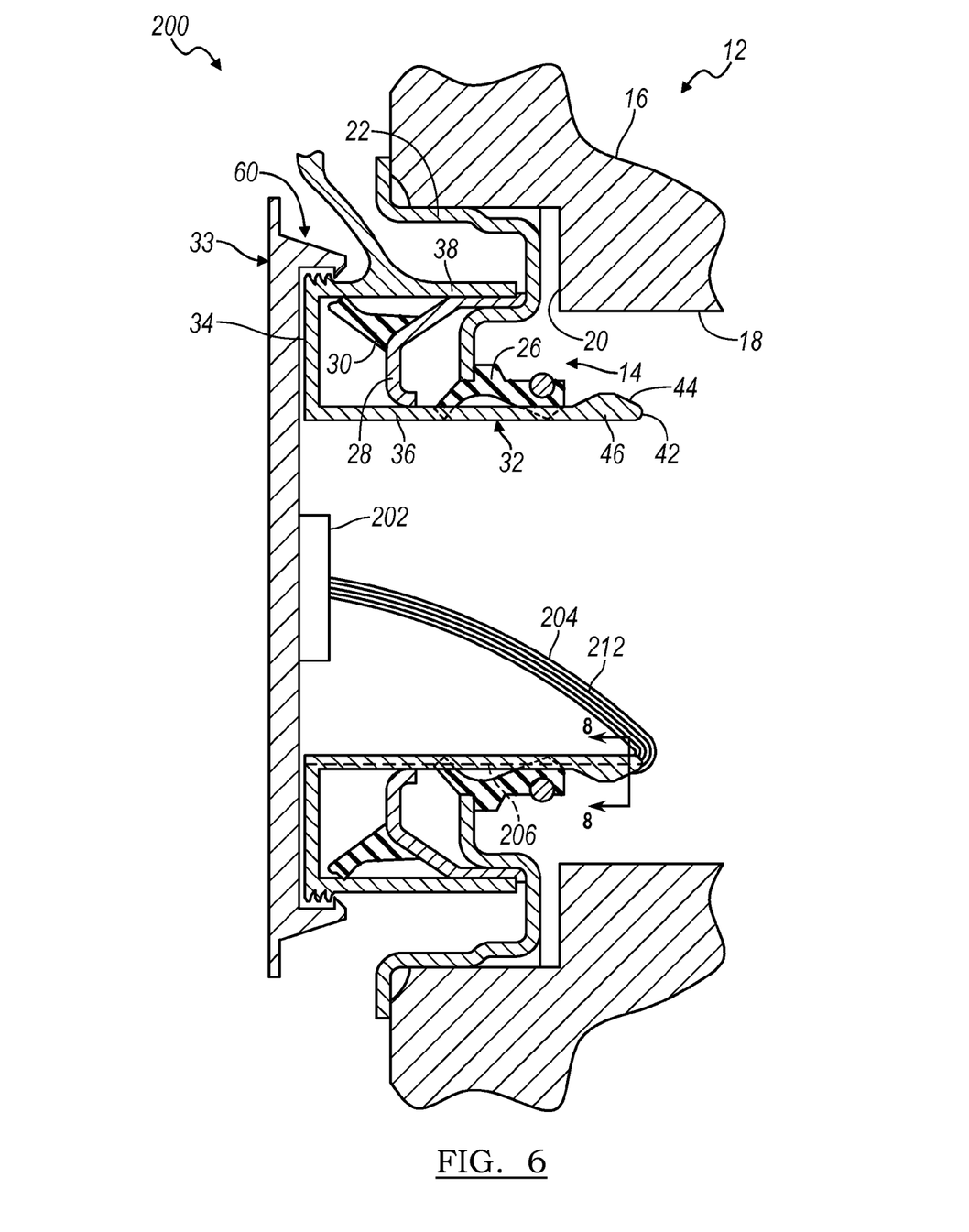
FIG. 6 is a cross-sectional view of another embodiment of a seal protector assembly according to the principles of the present invention shown in use with an exemplary axle seal and a portion of an exemplary transmission.
Figure 7:
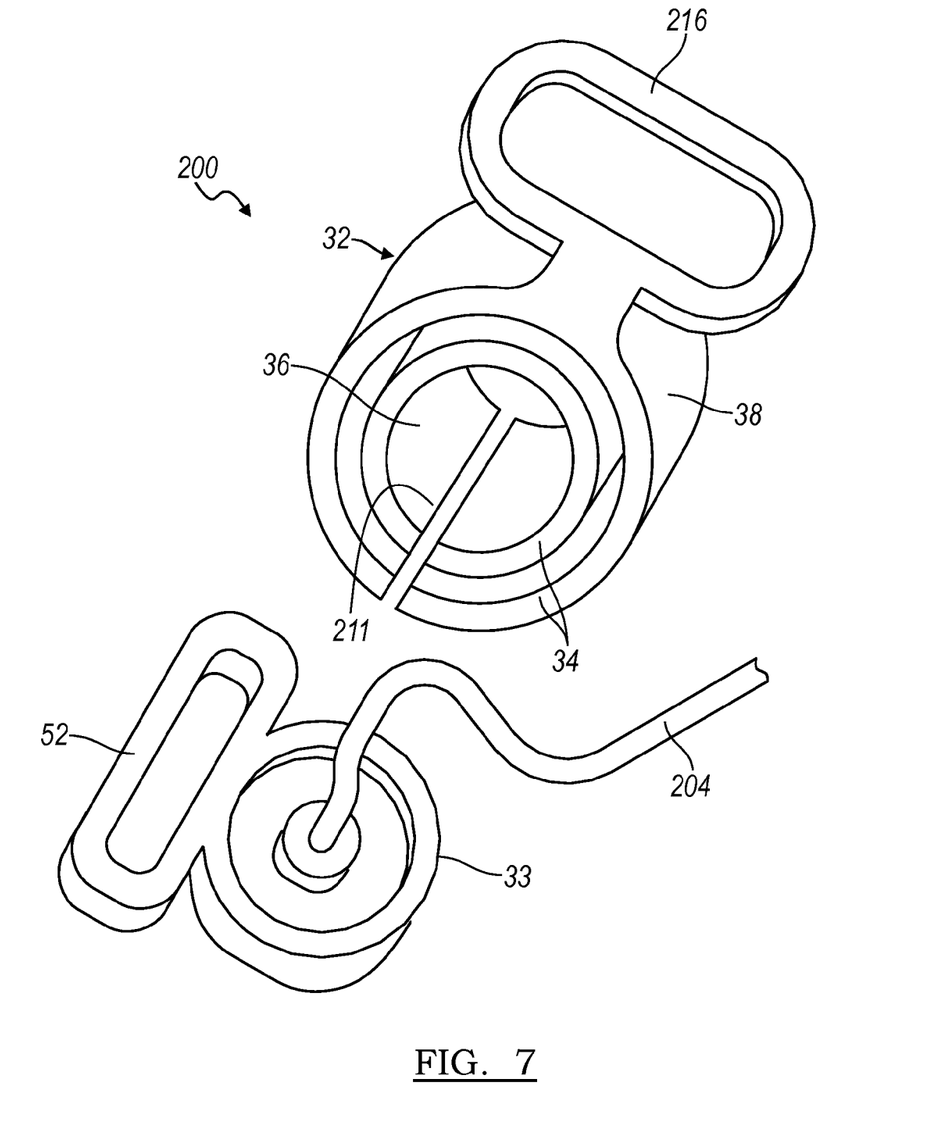
FIG. 7 is a front perspective view of the seal protector assembly shown in FIG. 6 with a portion of the seal protector assembly removed.
Figure 8:
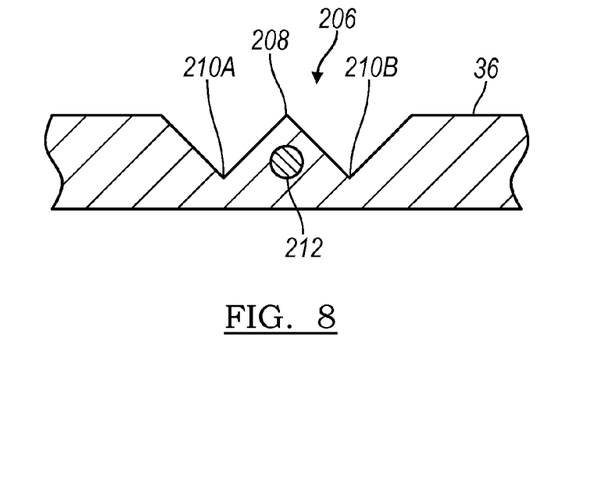
FIG. 8 is a cross-sectional view of a portion of the seal protector assembly taken in the direction of arrow 8-8 in FIG. 6.

Turning now to FIGS. 6 and 7, another alternate seal protector assembly is generally indicated by reference number 200. The seal protector assembly 200 is similar to the seal protector assembly 10 and therefore like components are indicated by like reference numbers. However, the seal protector assembly 200 includes a system that replaces the reduced thickness portion 50 in the seal protector 32 to facilitate the removal of the seal protector 32 from the axle seal 14 and the axle shaft 70. Specifically, the plug 33 includes a base 202 located centrally on an inner surface of the plug 33. A cord 204 is connected at one end thereof to the base 202. The cord 204 is connected at an opposite end thereof with a zip feature 206 formed in the inner surface of the inner member 36. Turning briefly to FIG. 8, the zip feature 206 includes a thick portion 208 defined by two divots or reduced thickness portions 210A and 210B located on each side of the thick portion 208. Both the cord 204 and the thick portion 208 may include a metal wire core 212 in order to strengthen the cord 204 and the zip feature 206. The seal protector assembly 100 is a unitary piece wherein the plug 33 is connected to the seal protector 32 via the cord 204.

Turning to FIG. 7, when the plug 33 is removed from the seal protector 32, the cord 204 pulls the zip feature 206 causing the thick portion 208 to separate at the divots 210A and 210B. Once the zip feature 206 is fully removed, the seal protector 32 is separated and a gap 211 is formed in the seal protector along an axis thereof and the seal protector 32 can easily be removed from the axle seal 14 and the axle shaft 70 as the amount of force required to remove the seal protector 32 is only that needed to deflect the seal protector 32 and does not include the force necessary to separate the seal protector 32. The seal protector assembly 200 otherwise operates in a manner similar to the seal protector assembly 10 as described above.

Figure 9:
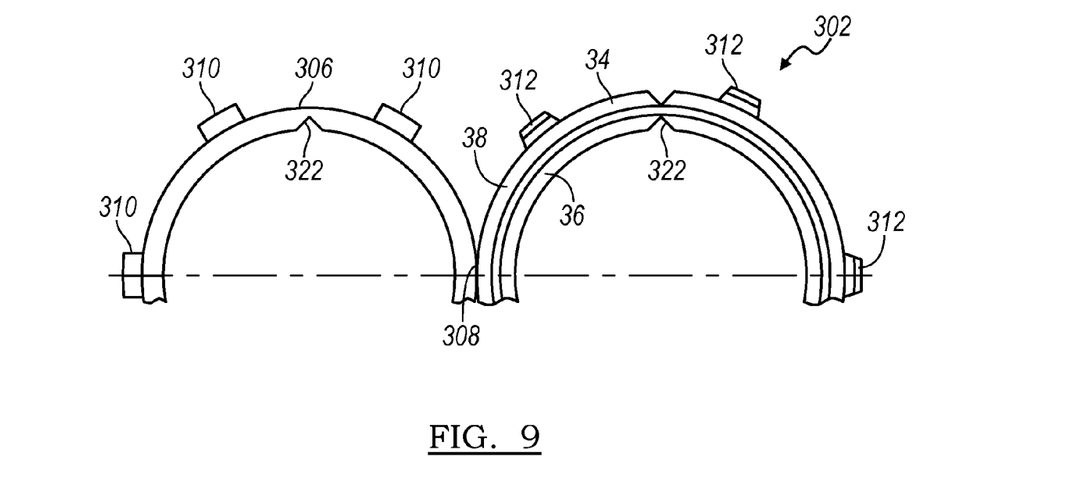
FIG. 9 is a partial front view of another embodiment of a seal protector assembly.
Figure 10:
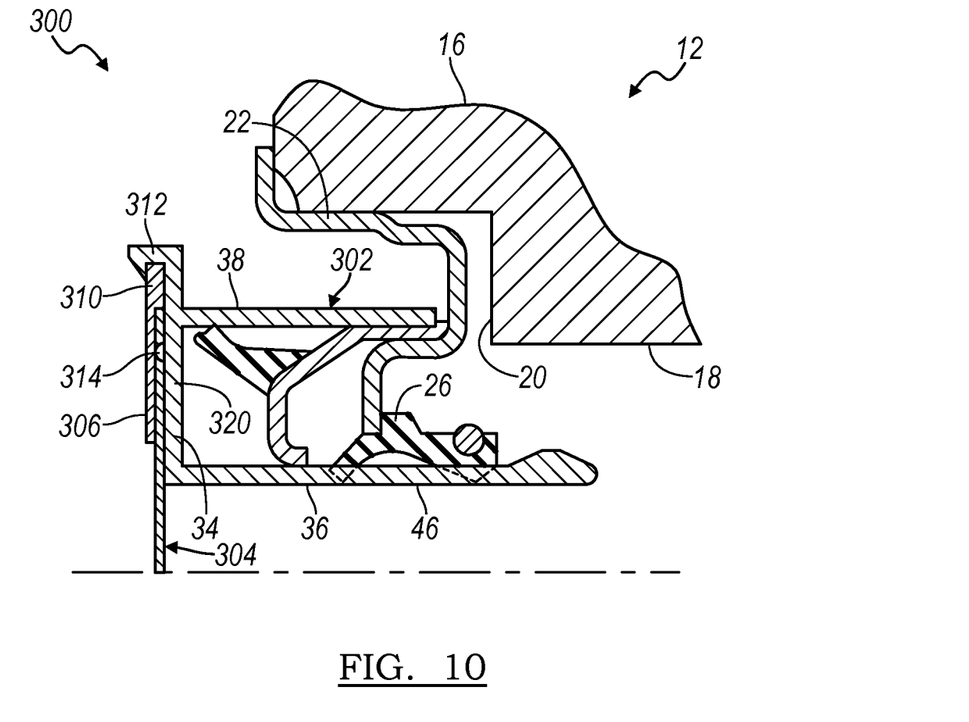
FIG. 10 is a partial cross-sectional view of the seal protector assembly shown in FIG. 9 shown in use with an exemplary axle seal and a portion of an exemplary transmission.

With reference to FIGS. 9 and 10, another alternate seal protector assembly is generally indicated by reference number 300. The seal protector assembly 300 is similar to the seal protector assembly 10 and therefore like components are indicated by like reference numbers. However, the seal protector assembly 300 includes a modified seal protector 302 and plug 304. The seal protector 302 includes a clamp portion 306. The clamp portion 306 is hinged to the outer member 38 at a hinge joint 308. The clamp portion 306 is annular and has a plurality of tab members 310 that extend radially outwards. The tab members 310 are aligned with a plurality of clips 312 that extend radially outward from the outer surface of the outer member 38.

Figure 11:
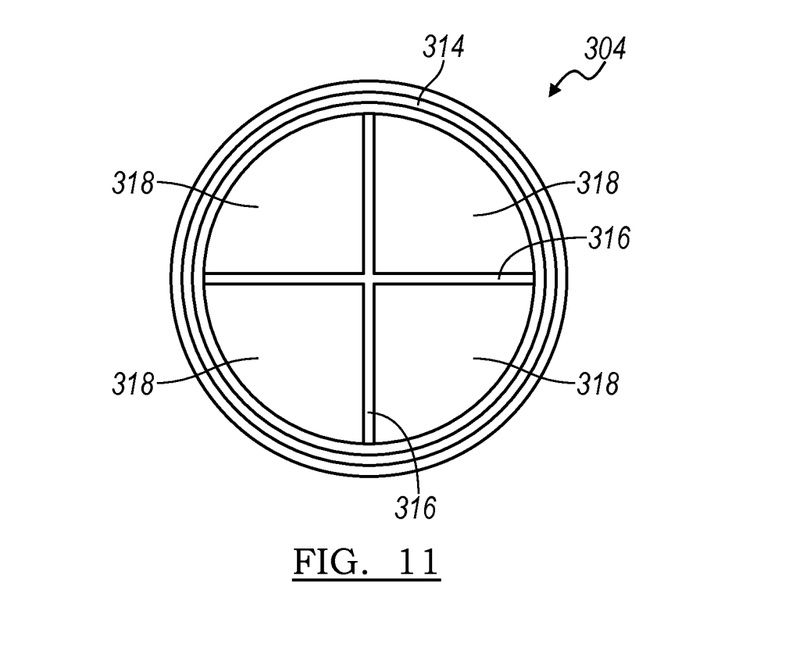
FIG. 11 is a front view of a plug used with the seal protector assembly shown in FIGS. 10 and 11.

Turning to FIG. 11, the plug 304 is a rubber or other flexible disc having an annular bead 314 located along a periphery of the plug 304. In addition, the plug 304 has thin sections 316 that extend across the plug 304. In the example provided, the thin sections 316 divide the plug 304 into four thick sections 318. However, additional thin sections 316 may be provided without departing from the scope of the present invention.

Returning to FIG. 10, the seal protector 302 is installed over the axle seal 14. The plug 304 is placed adjacent the radial portion 34. The bead 314 fits within an annular groove 320 located in the radial portion 34. The plug 304 is secured to the seal protector 302 by closing the clamp portion 306 until the tabs 310 are secured within the clips 312.

During assembly of the transmission 12, the plug 304 is not removed from the seal protector 302. Instead, the axle shaft 70 pierces the plug 304 by separating the plug along the thin sections 316. The seal protector 302 protects the axle seal 14 as described above in prior embodiments. To remove the seal protector 302 and plug 304, the seal protector is pulled at the hinged joint 308 or at another pull feature and the seal protector 302 separates at reduced thickness portions 322 located on the seal protector 302 and the clamp 306. The plug 304, despite being pierced, is retained by the clamp 306 and the seal protector 302, thereby preventing debris from the plug 304 from remaining with the transmission 12.

The description of the invention is merely exemplary in nature and variations that do not depart from the general essence of the invention are intended to be within the scope of the invention. Such variations are not to be regarded as a departure from the spirit and scope of the invention.

The following is claimed:

1. A device for enclosing an annular seal in an opening of a transmission, the device comprising:
   an annular ring having a surface that extends radially and defines an opening coaxial with an axis, an outer flange extending axially from the surface and an inner flange extending axially from the surface inward of the outer flange, wherein the surface and the first and second flanges cooperate to define a slot for receiving the annular seal; and
   a cap removably attached to the annular ring and disposed over the opening of the annular ring to seal the opening of the transmission.

2. The device of claim 1 wherein the first and second flanges are annular and parallel to one another and enclose the seal within the slot.

3. The device of claim 1 wherein the second flange includes a retainer feature disposed on an outer surface of the second flange proximate a distal end of the second flange in order to retain the annular ring within the opening of the transmission.

4. The device of claim 1 wherein the surface includes a sealing feature for sealing the cap to the annular ring when the cap is attached to the annular ring.

5. The device of claim 1 wherein the first flange has an axial length less than an axial length of the second flange.

6. The device of claim 1 wherein the second flange has an axial length configured to have a distal end located within the transmission opening past the annular seal.

7. The device of claim 1 wherein the annular ring includes a pull feature for removing the annular ring from the opening of the transmission.

8. The device of claim 7 wherein the pull feature is a tab extending from an outer surface of the first flange.

9. The device of claim 1 wherein the second flange includes a connecting feature disposed on an outer surface of the second flange proximate the surface.

10. The device of claim 9 wherein the connecting feature is a snap-fit connection and the cap includes a pull feature for removing the cap from the annular ring.

11. The device of claim 9 wherein the connecting feature includes threaded portions located on the outer surface of the second flange and on an axial extension of the cap and the cap includes a grip feature for removing the cap from the annular ring.

12. The device of claim 1 wherein the cap is connected to the annular ring by a snap-fit connection and by a pull line connected at one end to an inside surface of the cap and at an opposite end to a distal end of the second flange at a break feature that extends axially along the second flange, wherein when the cap is removed, the pull line axially separates the annular ring along the break feature.

13. The device of claim 12 wherein the break feature includes a thick portion defined by two divots of reduced cross-section area relative to the thick portion that extend axially along a length of the inner surface of the second flange, wherein the pull line is connected to the thick portion, and wherein when the cap is removed the pull line separates the thick portion from the annular ring, thereby axially separating the annular ring in order to allow the annular ring to be removed from the opening of the transmission.

14. The device of claim 13 wherein the pull line includes a metal wire core connected to the inside surface of the cap and extending through the pull line and through the thick portion of the reduced cross section area of the second flange.

15. The device of claim 1 wherein the first and second flanges are annular and enclose the seal within the slot.

16. The device of claim 1 wherein the second flange includes a break feature configured to separate the second flange.

17. The device of claim 16 wherein the break feature includes a thick portion defined by two divots of reduced cross-section area relative to the thick portion that extend axially along a length of the inner surface of the second flange.

18. A device for enclosing an annular seal in an opening of a transmission, the device comprising:

an annular ring having a surface that extends radially and defines an opening coaxial with an axis, an outer flange extending axially from the surface and an inner flange extending axially from the surface inward of the outer flange, wherein the surface and the first and second flanges cooperate to define a slot and wherein the first and second flanges are annular and parallel to one another and enclose the seal within the slot; and a cap removably attached to the annular ring and disposed over the opening of the annular ring to seal the opening of the transmission.

19. A device for enclosing an annular seal in an opening of a transmission, the device comprising:

an annular ring having a surface that extends radially and defines an opening coaxial with an axis, an outer flange extending axially from the surface and an inner flange extending axially from the surface inward of the outer flange, wherein the surface and the first and second flanges cooperate to define a slot for receiving the annular seal and wherein the second flange has an axial length configured to have a distal end located within the transmission opening past the annular seal; and a cap removably attached to the annular ring and disposed over the opening of the annular ring to seal the opening of the transmission.

\* \* \* \* \*